US011149455B2

(12) United States Patent
Huang et al.

(10) Patent No.: US 11,149,455 B2
(45) Date of Patent: Oct. 19, 2021

(54) ADJUSTABLE SUPPORT FOR A SWIMMING MACHINE

(71) Applicant: BESTWAY INFLATABLES & MATERIAL CORP., Shanghai (CN)

(72) Inventors: Shuiyong Huang, Shanghai (CN); Wenhau Hu, Shanghai (CN); Qinliang Tan, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 86 days.

(21) Appl. No.: 16/659,219

(22) Filed: Oct. 21, 2019

(65) Prior Publication Data

US 2020/0123797 A1 Apr. 23, 2020

(30) Foreign Application Priority Data

Oct. 22, 2018 (CN) .......................... 201821708645.0

(51) Int. Cl.
*E04H 4/00* (2006.01)
*E04H 4/12* (2006.01)
*F16M 13/02* (2006.01)

(52) U.S. Cl.
CPC ............. *E04H 4/12* (2013.01); *F16M 13/022* (2013.01); *F16M 2200/028* (2013.01)

(58) Field of Classification Search
CPC .. E04H 4/12; F16M 13/022; F16M 2200/028; A63B 69/125
See application file for complete search history.

(56) References Cited

U.S. PATENT DOCUMENTS 7,526,820 B2 * 5/2009 Murdock .............. E04H 4/0006
4/492
9,234,496 B2 * 1/2016 Braswell ............... F03B 17/061
(Continued)

FOREIGN PATENT DOCUMENTS

| DE | 2313326 | 9/1974 |
| EP | 0581997 | 2/1994 |
| WO | 2014071536 | 5/2014 |

OTHER PUBLICATIONS

Extended European Search Report dated Mar. 19, 2020 (Mar. 19, 2020) issued by the European Patent Office on related European patent application 19203826.3.

*Primary Examiner* — Amy J. Sterling
(74) *Attorney, Agent, or Firm* — Dickinson Wright PLLC

(57) ABSTRACT

An adjustable support for a provided swimming machine includes a movable assembly and a fixed assembly for adjusting the height of the provided swimming machine. The movable assembly is fixedly mounted to the provided swimming machine. The fixed assembly is attached to a pool wall of a provided swimming pool and selectively coupled to the movable assembly. One of the movable assembly or the fixed assembly includes a plurality of engaging portions, and the other of the movable assembly or the fixed assembly includes a limiting member that mates with at least one of the plurality of engaging portions. The movable assembly is switchable between a locked position and an unlocked position. The limiting member fixedly engages at least one of the plurality of engaging portions in the locked position. The limiting member is disengaged from the at least one of the plurality of engaging portion in the unlocked position, thereby providing for the movable assembly to move vertically relative to the fixed assembly.

20 Claims, 5 Drawing Sheets

(56) References Cited

U.S. PATENT DOCUMENTS 9,855,479 B2 * 1/2018 Cameron .................. E04H 4/12
9,979,182 B2 * 5/2018 Lin ........................ F16M 13/02

* cited by examiner

ADJUSTABLE SUPPORT FOR A SWIMMING MACHINE

CROSS REFERENCE TO RELATED APPLICATION

This U.S. utility patent application claims the benefit of Chinese patent application No. 201821708645.0, filed Oct. 22, 2018, the content of which is incorporated herein by reference in its entirety. This U.S. utility patent application also incorporates applicant's co-pending U.S. application Ser. No. 16/507,869, filed Jul. 10, 2019 by reference in its entirety.

TECHNICAL FIELD

The present disclosure generally relates to a swimming machine. More specifically, the present disclosure relates to an adjustable support for a provided swimming machine and a swimming machine having the adjustable support.

BACKGROUND

Swimming is a popular form of physical exercise among a wide range of people. Swimming machines that circulate water in a swimming pool can enable swimming training to be performed in swimming pools that would otherwise be too small for such activity. A swimming machine includes a swimming machine body and an attachment bracket. The swimming machine body is fixed to a wall of the swimming pool by the attachment bracket with the swimming machine body submerged in the swimming pool. By generating a strong water flow in the swimming pool, a swimming machine may produce resistance conditions in the swimming pool, thus providing effects of long-distance swimming in a small space.

Although existing swimming machines are suitable for most traditional swimming pools, it may be necessary to adjust the vertical position of the swimming machine body to accommodate different types of swimming pools and water levels to achieve a desired water flow for swimming. However, vertical position adjustment mechanisms of conventional swimming machines have complex structures, and it can be difficult and/or inconvenient to adjust the vertical position of a conventional support bracket, and therefore, the vertical position of the swimming machine body.

SUMMARY

In accordance with various embodiments of the present disclosure, an adjustable support for a provided swimming machine comprises a movable assembly and a fixed assembly. The movable assembly is configured to be fixedly mounted to the provided swimming machine. The fixed assembly is configured to be fixed to a pool wall of a provided swimming pool and selectively coupled to the movable assembly. One of the movable assembly or the fixed assembly includes a plurality of engaging portions and the other of the movable assembly or the fixed assembly includes a limiting member for mating with at least one of the plurality of engaging portions. The movable assembly is switchable between a locked position and an unlocked position to adjust a vertical position of the provided swimming machine. The limiting member fixedly engages the at least one of the plurality of engaging portions in the locked position. The limiting member is disengaged from the at least one of the plurality of engaging portions in the unlocked position, thereby providing for the movable assembly to move relative to the fixed assembly.

In accordance with various embodiments of the present disclosure, a swimming machine comprises a swimming machine body and an attachment bracket configured to attach the swimming machine body to a pool wall of a provided swimming pool. The swimming machine includes at least one adjustable support. The adjustable support comprises a movable assembly and a fixed assembly. The movable assembly fixedly mounted to the swimming machine body. The fixed assembly is fixed to the attachment bracket and selectively coupled to the movable assembly. One of the movable assembly or the fixed assembly includes a plurality of engaging portions and the other of the movable assembly or the fixed assembly includes a limiting member for mating with at least one of the plurality of engaging portions. The movable assembly is switchable between a locked position and an unlocked position to adjust a vertical position of the swimming machine body. The limiting member fixedly engages the at least one of the plurality of engaging portions in the locked position. The limiting member is disengaged from the at least one engaging portion in the unlocked position, thereby providing for the movable assembly to move relative to the fixed assembly.

In some embodiments, the fixed assembly comprises a first fixed half connected to a second fixed half to define a hollow cavity therebetween. The first fixed half and/or the second fixed half includes the plurality of engaging portions. The movable assembly is disposed within the hollow cavity and configured to engage the at least one of the plurality of engaging portions in the locked position.

In some embodiments, the first fixed half includes a plurality of protrusions or slots, and the second fixed half includes a corresponding plurality of slots or protrusions configured to be connected to the first fixed half.

In some embodiments, the movable assembly includes the limiting member, and the fixed assembly includes the plurality of engaging portions. The movable assembly comprises a mounting base fixedly mounted to the swimming machine body. The limiting member includes a limiting pin to selectively engage the at least one of the plurality of engaging portions of the fixed assembly, and the limiting member is capable moving to disengage from the at least one of the plurality of engaging portion, thereby placing the movable assembly in the unlocked position.

In some embodiments, the movable assembly comprises a first movable half connected to a second movable half to define a hollow cavity therebetween. The movable assembly also comprises a vertically movable guiding member disposed within the hollow cavity. The first movable half and the second movable half each define limiting grooves, and the guiding member defines a guiding groove. The limiting member extends through the limiting grooves to selectively engage the at least one of the plurality of engaging portions of the fixed assembly. Movement of the guiding member forces the limiting pin to move along the limiting grooves, thereby causing the limiting pin to disengage from the at least one of the plurality of engaging portions.

In some embodiments, the guiding groove defines an angle with respect to the limiting grooves. More specifically, in some embodiments, the guiding groove defines an angle of 30 degrees to 60 degrees with respect to the limiting grooves.

In some embodiments, the first movable half includes a plurality of protrusions or slots, and the second movable half includes a corresponding plurality of slots or protrusions configured to be connected to the first movable half.

In some embodiments, the movable assembly can be manually shifted between the locked position and the unlocked position using a latch handle coupled to the limiting member.

In some embodiments, the movable assembly is configured to be manually shifted between the locked position and the unlocked. The adjustable support includes a latch handle coupled to the guiding member and configured to move the guiding member.

In some embodiments, the adjustable support further comprises an elastic return member configured to cause the movable assembly to automatically return to the locked position from the unlocked position.

In some embodiments, the swimming machine includes two adjustable supports arranged in mirror symmetry with one another.

In some embodiments, the swimming machine includes two adjustable supports, with limiting members of each of the two adjustable supports being movable in opposite directions with respect to each other and each configured to disengage from a corresponding one or more of the plurality of engaging portions in the unlocked position.

BRIEF DESCRIPTION OF THE DRAWINGS

To understand the present disclosure, it will be described by way of example, with reference to the accompanying drawings in which implementations of the disclosure are illustrated and, together with the descriptions below, serve to explain the principles of the disclosure.

DETAILED DESCRIPTION

Figure 1:
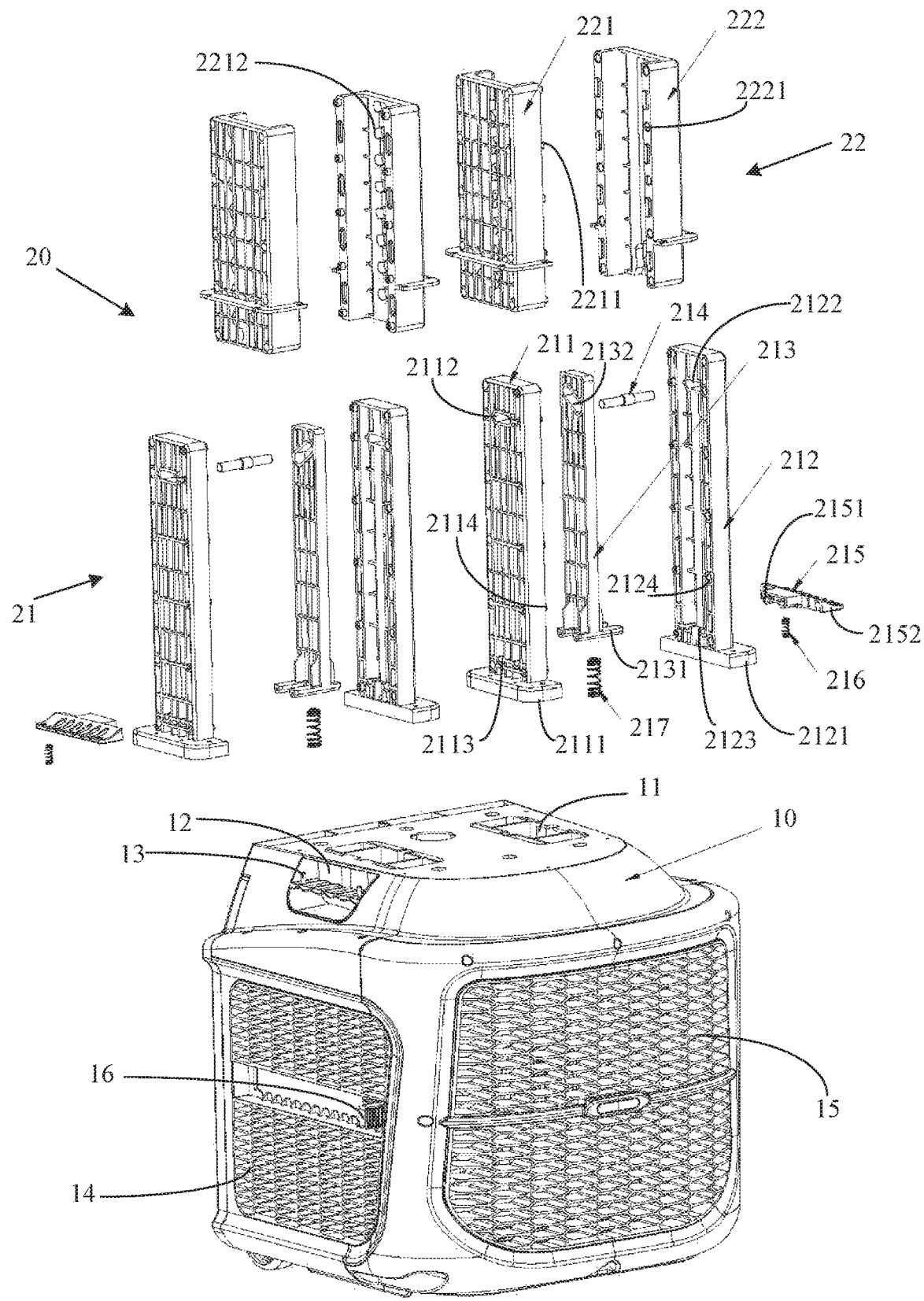
FIG. 1 is a perspective and partially-exploded view of a swimming machine having an adjustable support, according to embodiments of the present disclosure.
Figure 2:
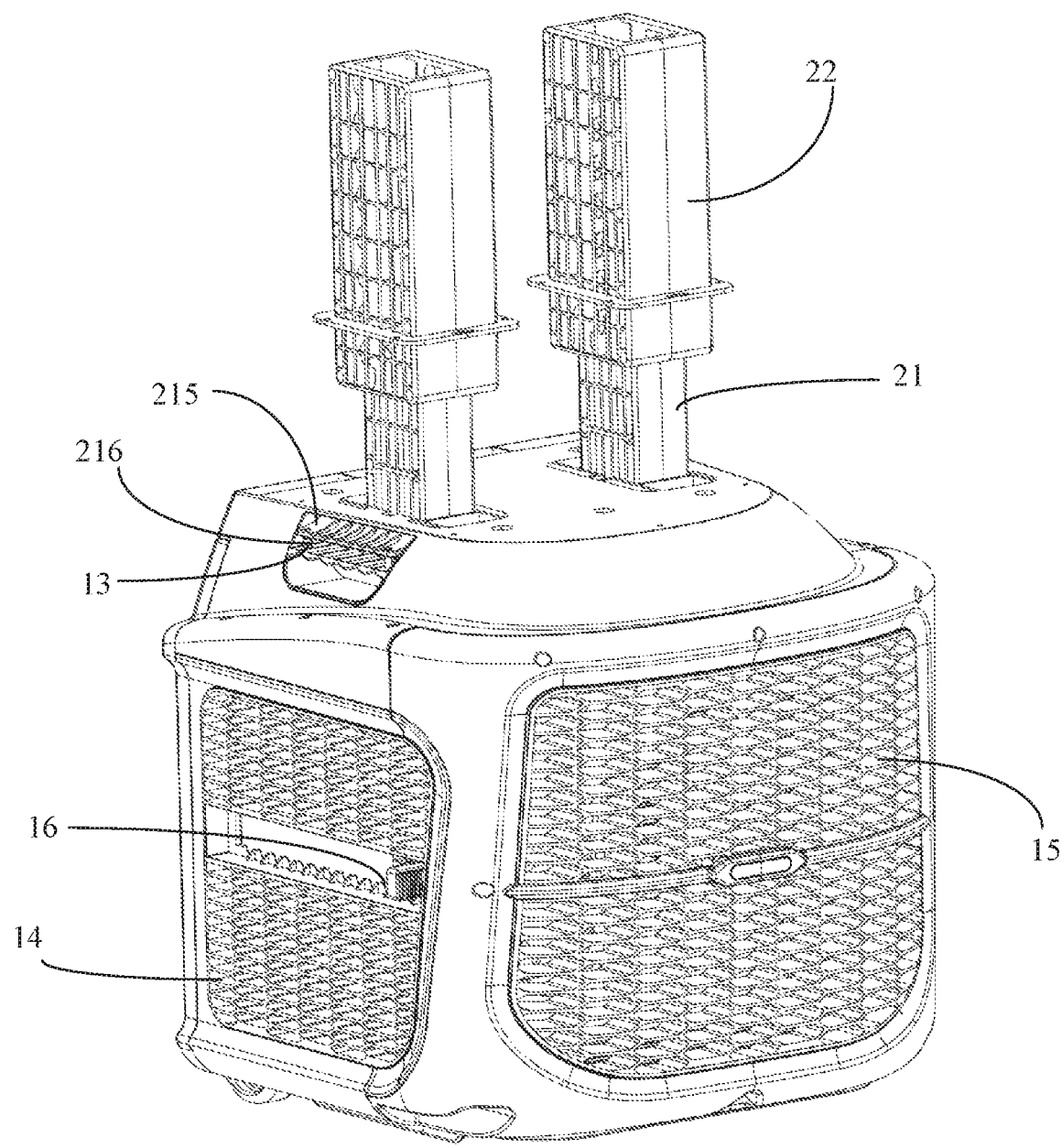
FIG. 2 is a perspective view showing the adjustable support of FIG. 1 in a locked position.

The exemplary embodiments of the present disclosure are described below with reference to the drawings for illustration. It should be understood that the description about the exemplary embodiments should be considered as mere illustration of structures and principles of operation, and the present disclosure is not limited to the exemplary embodiments. In the description for the structural positions of various components, representations of directions, such as "upper", "lower", "top" and "bottom" are not absolute, but relative. When the various components are arranged as shown in the drawings, these representations of directions are appropriate. However, when the positions of the various components in the drawings are changed, these representations of directions are changed accordingly.

Herein, "vertical" refers to the height or depth direction of the swimming machine upon being coupled to the swimming pool, and "horizontal" refers to a direction perpendicular to the height direction of the swimming machine and generally parallel to the water surface.

The present disclosure provides an adjustable support 20 for a swimming machine. The adjustable support 20 can flexibly adjust the vertical position of the swimming machine body 10 to accommodate different types of swimming pools and/or different water levels.

The adjustable support 20 of the present disclosure addresses problems for which conventional swimming machine supports have complex structures and are inconvenient to use. The adjustable support 20 of the present disclosure provides for the vertical position of the swimming machine to be adjusted by the vertical movement of the movable assembly relative to the fixed assembly using engaging portions and a limiting member. In particular, this adjustment can be performed manually, and is simple, reliable, and effective. The adjustable support 20 of the present disclosure has a low cost and a relatively simple production process, thus being suitable for various swimming machines and for large-scale industrial production and application.

FIGS. 1-5 illustrate a swimming machine equipped with an adjustable support 20, according to embodiments of the present disclosure. The swimming machine includes a swimming machine body 10 and an attachment bracket (not shown) configured to attach the swimming machine body 10 to the pool wall of the swimming pool (not shown). The swimming machine body 10 includes a housing and a drive system 16 arranged within the housing. During use, water in the swimming pool is drawn via multiple water inlet ports 14 and processed by the drive system 16. Then, the water flows back into the swimming pool from multiple water outlet ports 15. The water inlet port 14 and the water outlet port 15 may be combined with laminar flow plates in specific shapes to smooth the water flow flowing into and out of the swimming machine body 10 and avoid the influence of rapid water flow or turbulent flow on the swimming machine itself and the user. The drive system 16 may be provided with multiple gears to realize different water flow rates according to user requirements. The drive system 16 may also be combined with a filtering device, a disinfecting device, a temperature control device, etc., to meet usage requirements of different users. The adjustable support 20 of the present disclosure is intended to be used with various different swimming machines, and as such, the swimming machine in the drawings is merely exemplary. Thus, the components and functions of the swimming machine will not be described herein.

In accordance with embodiments of the present disclosure, an adjustable support 20 is provided to adjust the swimming machine, particularly the vertical position of the swimming machine body 10, to accommodate different swimming pools and water levels. The swimming machine body 10 shown in FIG. 1 is supported by two adjustable supports 20. A swimming machine may be supported by any number adjustable supports 20 (i.e., one, two or more). For the sake of simplicity, the present disclosure describes one adjustable support 20.

The adjustable support 20 includes a movable assembly 21 and a fixed assembly 22. The movable assembly 21 is fixedly mounted to the swimming machine body 10. The fixed assembly 22 is attached to an attachment bracket (not shown) and selectively coupled to the movable assembly 21. The movable assembly 21 is switchable between a locked position and an unlocked position to adjust the vertical position of the swimming machine body 10. In some embodiments, one of the movable assembly 21 or the fixed assembly 22 includes a plurality of engaging portions, and the other of the movable assembly 21 or the fixed assembly 22 includes a limiting member 214 for mating with at least one of the plurality of engaging portions 2212. The limiting member 214 fixedly engages with at least one of the plurality of engaging portions 2212 in the locked position. The limiting member 214 is disengaged from the at least one of the plurality of engaging portions 2212 in the unlocked position, thus providing for the movable assembly 21 to move vertically with respect to the fixed assembly 22, so that the vertical position of the swimming machine body 10 can be adjusted.

Figure 3:
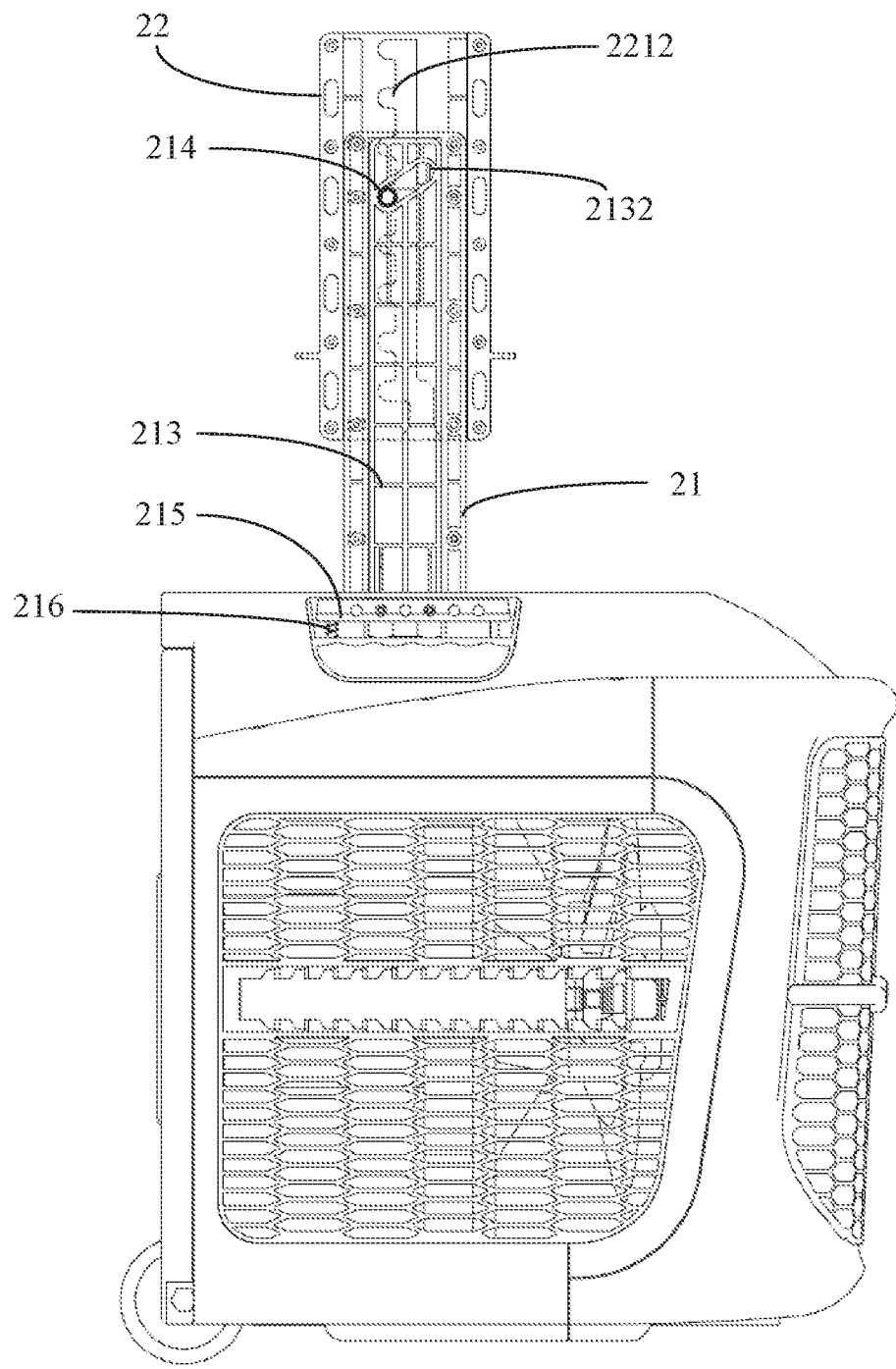
FIG. 3 is a side view of the adjustable support in the locked position shown in FIG. 2.

In some embodiments, and as shown in FIG. 1, the fixed assembly 22 includes a first fixed half 221 connected to a second fixed half 222 to define a hollow cavity therebetween. The first fixed half 221 and the second fixed half 222 may be provided in a generally U-shape as shown in the drawings or in other shapes, such as a semicircle shape. In some embodiments, the first fixed half 221 and/or the second fixed half 222 are provided with a plurality of engaging portions 2212, for example multiple engaging portions 2212 on the first fixed half 221 as exemplarily shown in FIG. 1. The movable assembly 21 is disposed within in the hollow cavity and configured to engage at least one of the plurality of engaging portions 2212 in the locked position. The plurality of engaging portions 2212 may be provided as multiple engaging grooves spaced apart from one another at regular intervals vertically, as shown in FIG. 3. Correspondingly, the movable assembly 21 may include a limiting member 214 capable of engaging with and disengaging from at least one of the plurality of engaging portions 2212. It should be understood that in some embodiments, the limiting structure may also be provided on the fixed assembly 22 and corresponding engaging portions 2212 may be provided on the movable assembly 21.

In some embodiments, the movable assembly 21 includes a mounting base fixedly mounted to the swimming machine body 10 and a limiting member 214 arranged on the mounting base. Specifically, in the embodiment shown in FIG. 1, the movable assembly 21 includes a first movable half 211 connected to a second movable half 212 to define a hollow cavity therebetween. Either or both of the first movable half 211 and/or the second movable half 212 may have a structural form that is different than what is shown in the drawings. The bottoms of the first movable half 211 and of the second movable half 212 are respectively provided with bases 2111, 2121 that may be attached to the swimming machine body 10. Correspondingly, the top of the housing of the swimming machine body 10 includes mounting openings 11 into which the bases 2111, 2121 are inserted and fixed. A vertically-movable guiding member 213 is disposed within the hollow cavity of the movable assembly 21. The first movable half 211 and the second movable half 212 each define limiting grooves 2112, 2122. The guiding member 213 defines a guiding groove 2132 configured to receive and to guide the limiting member 214. In some embodiments, the limiting member 214 is configured as a pin. However, the limiting member 214 may take other forms. In some embodiments, the limiting member 214 extends horizontally through the limiting grooves 2112, 2122 for engaging with at least one of the plurality of engaging portions 2212 of the fixed assembly 22. Thus, vertical movement of the guiding member 213 causes the limiting member 214 to move along the limiting grooves 2112, 2122, such that the limiting member 214 is disengaged from the at least one of the plurality of engaging portions 2212 and the movable assembly 21 is in the unlocked position. In some embodiments, the unlocking operation described above can be realized by arranging the guiding groove 2132 at an angle with respect to the limiting grooves 2112, 2122. The angle may be in the range of 30 to 60 degrees. The angle may be, for example, 45 degrees. In some embodiments, the limiting grooves 2112, 2122 and the guiding groove 2132 are provided adjacent to the top of the movable assembly 21 to achieve a larger adjustment range.

The adjustable support of the present disclosure provides for the movable assembly 21 to be manually shifted from the locked position to the unlocked position. In some embodiments, a latch handle 215 coupled to the limiting member 214 is used for switching the movable assembly 21 between the locked and unlocked positions. In some embodiments, the latch handle 215 is disposed outside of the movable assembly 21 and coupled to the guiding member 213 such that the user can move the guiding member 213 vertically to lock or unlock the movable assembly 21 by moving the latch handle 215.

In some embodiments, the latch handle 215 may include a retaining portion 2151 inserted into the movable assembly 21 and a pressing portion 2152 for the user to grip. Notches 2113, 2123 into which the retaining portion 2151 can be inserted are provided at the corresponding positions on the first movable half 211 and the second movable half 212. A structure mated with the retaining portion 2151 is also provided on the guiding member 213. For example, as shown in FIG. 1, an insert pin 2131 is provided on the guiding member 213 and can be inserted into a hole formed on the retaining portion 2151. In this manner, by gripping and moving the pressing portion 2152 of the latch handle 215, the guiding member 213 within the movable assembly 21 can also be moved. In some embodiments, the latch handle 215 may be provided adjacent to the bottom of the movable assembly 21. Correspondingly, notches 2113, 2123 on the first movable half 211 and on the second movable half 212, and the insert pin 2131 on the guiding member 213 may also be provided at or adjacent to the bottom of the movable assembly 21. In some embodiments, the latch handle 215 may be mounted to the swimming machine body 10. As shown in FIG. 1, the swimming machine body 10 may be provided with an engaging groove 12 configured to receive the latch handle 215.

In some embodiments, the movable assembly 21 may be configured to automatically return to the locked position when the movable assembly 21 is adjusted in place, after the movable assembly 21 is switched from the locked position to the unlocked position. For example, an elastic return member, such as a first spring 216 and/or a second spring 217, may be provided at the bottom of the latch handle 215 and/or the guiding member 213, as shown in FIG. 1. In some embodiments, the first spring 216 is disposed around a column pin 13 within the engaging groove 12

As an example, in the above embodiments, the movable assembly 21 and the fixed assembly 22 are both illustrated and described in the form of two halves. The first fixed half 221 may define multiple protrusions or slots. The second fixed half 222 may include corresponding multiple slots or protrusions to be connected to the first fixed half 221. For example, the protrusion 2211 on the first fixed half 221 can be inserted into the slot 2221 on the second fixed half 222. Similarly, the first movable half 211 include with multiple protrusions or slots. The second movable half 212 may include corresponding multiple slots or protrusions to be connected to the first movable half 211. For example, the protrusion 2114 on the first movable half 211 can be inserted into the slot 2124 on the second movable half 212. It should be understood that each of the movable assembly 21 and the fixed assembly 22 may be formed in one piece.

As can also be seen in FIG. 1, when the swimming machine body 10 has two adjustable supports 20, the two adjustable supports 20 may be arranged in mirror symmetry.

For example, the orientations of the latch handles 215 of the two adjustable supports may be provide toward the same side of the swimming machine body 10, or toward opposite sides of the swimming machine body 10, as shown in the drawings. In some embodiments, when the movable assemblies 21 of the two adjustable supports 20 are switched from the locked position to the unlocked position, their respective limiting members 214, are moved and disengaged from the engaging portions in opposite directions, for example, in the manner shown in FIG. 1. Thereby, even if the vertical position of the swimming machine body 10 needs to be adjusted during the operation of the swimming machine, the thrust of the drive system within the swimming machine body 10 and the thrust of the water flow do not adversely affect the movement of the movable assembly 21, thus avoiding or reducing a risk of unexpected detachment when the vertical position is adjusted.

The operation mode of adjusting the vertical position of the swimming machine body 10 by the adjustable support 20 is described with reference to FIGS. 2 to 5 in the following. First, referring to FIGS. 2 and 3, the adjustable support 20 is shown in the locked position. At this time, the limiting member 214 of the movable assembly 21 is engaged with the engaging portion 2212 on the fixed assembly 22. The movable assembly 21 is in the locked position. The latch handle 215 connected to the guiding member 213 is in an initial state, and the first spring 216 below the latch handle 215 is not compressed.

Figure 4:
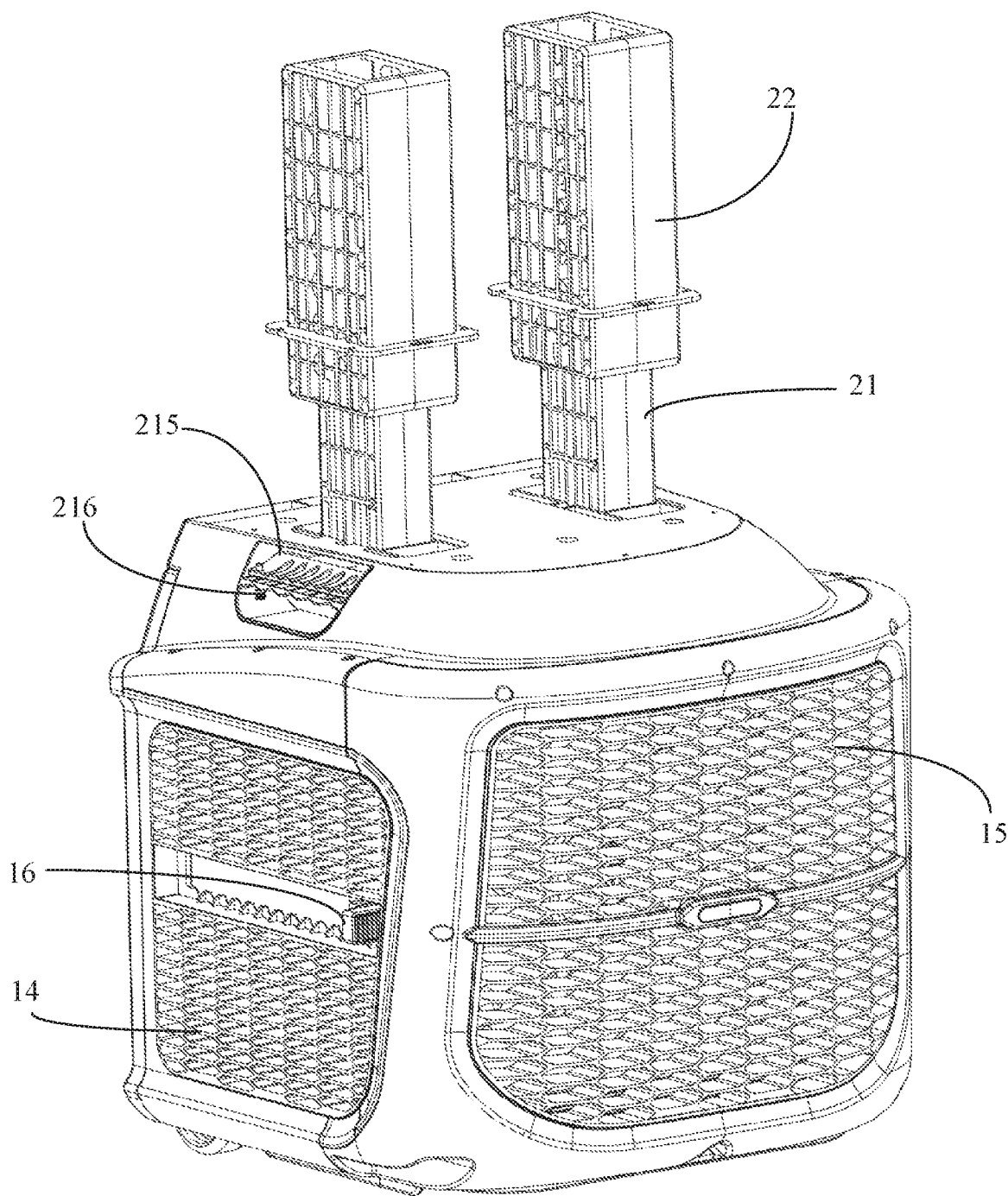
FIG. 4 is a perspective view showing the adjustable support of FIG. 1 in an unlocked position.
Figure 5:
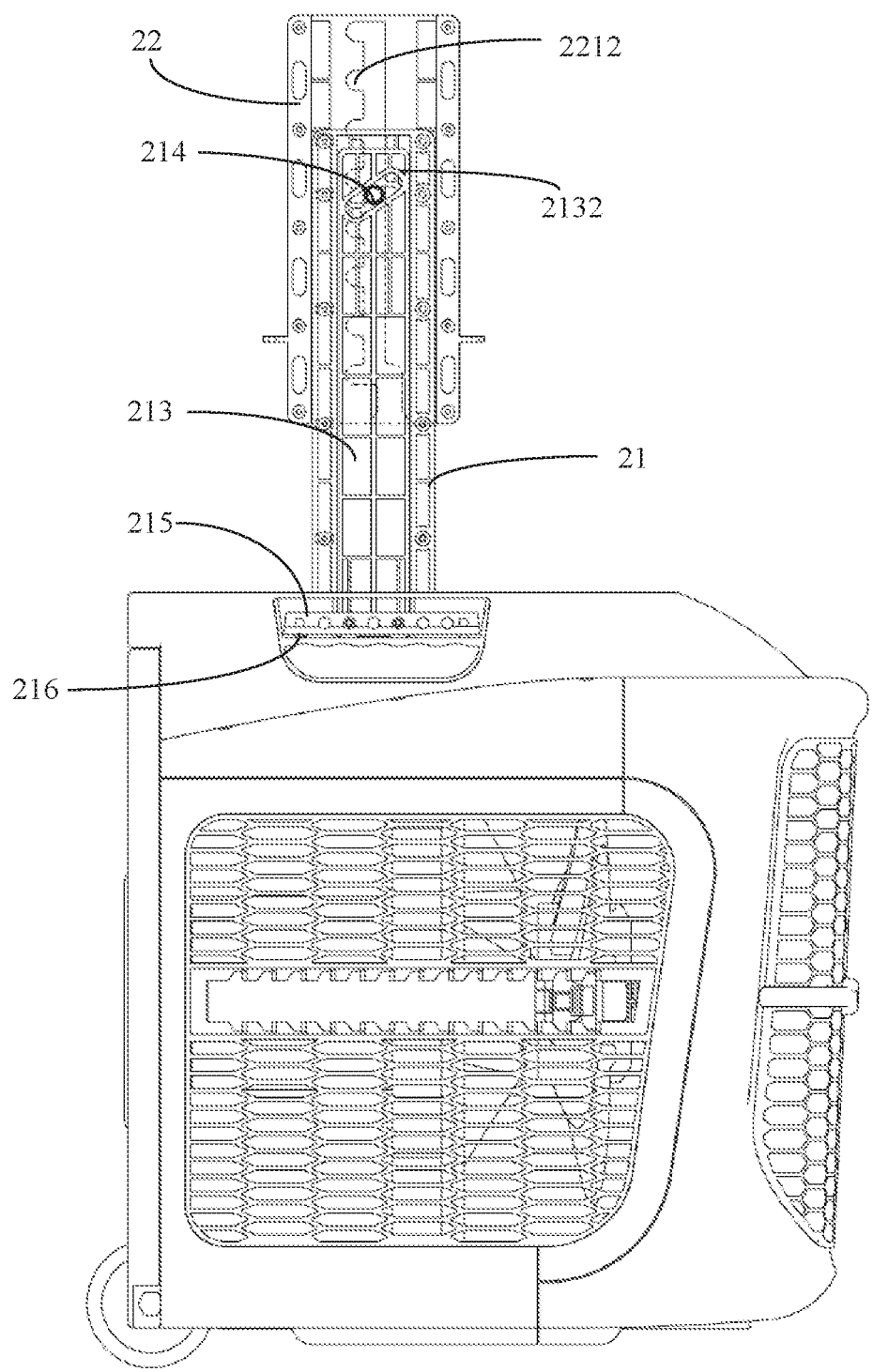
FIG. 5 is a side view of the adjustable support in the unlocked position shown in FIG. 4.

When adjusting the height of the swimming machine body 10, the user can press the latch handle 215, such that the first spring 216 is compressed, as shown in FIGS. 4 and 5. At this time, the latch handle 215 drives the guiding member 213 to move downward in the vertical direction. Due to the inclined arrangement of the guiding groove 2132 on the guiding member 213, downward movement of the guiding member 213 forces the limiting member 214 to move horizontally along the limiting grooves 2112, 2122 on the first movable half 211 and the second movable half 212, and the limiting member 214 is moved to the right and disengaged from the engaging portion 2212 as shown in FIG. 5. Then, the movable assembly 21 can be moved up and down with respect to the fixed assembly 22 in the vertical direction to adjust the height of the swimming machine body 10. When the movable assembly 21 is moved to an appropriate height, the latch handle 215 is released, and the guiding member 213 and the latch handle 215 automatically move up and return under the action of the spring. The guiding groove 2132 forces the limiting member 214 to move to the left and reinsert into the engaging portion 2212, thereby completing the height adjustment of the swimming machine body 10.

The adjustable support 20 of the present disclosure, thus provides for height adjustment of the swimming machine body 10, and particular for a manual height adjustment. The adjustable support 20 of the present disclosure has a simple structure and is easy to operate compared with conventional adjustable supports. The embodiments shown in FIGS. 1-5 are mere examples to demonstrate the various components of the adjustable support 20 for a swimming machine according to the present disclosure, and are merely illustrative and not restrictive. Other shapes, sizes, and arrangements can be employed without departing from the spirit and scope of the present disclosure. Further, the shape and size of the swimming machine and the manner in which the swimming machine is attached to the adjustable support 20 are merely examples. The adjustable support 20 of the present disclosure can be modified to be used with for various different swimming machines. Although the present disclosure illustrates various embodiments, modifications can be made without departing from the spirit of the present disclosure. Any such modifications come within the scope of the present disclosure.

The above detailed descriptions merely set forth particular embodiments of the present disclosure. Those skilled in the art understand that various modifications can be made according to the teachings of the present disclosure and various equivalents can be utilized to practice the present disclosure. Therefore, the particular embodiments set forth herein are intended to set forth the present disclosure, not to limit the scope of the present disclosure. Therefore, various modifications, changes, and replacements come within the scope of the present disclosure. The adjustable support can be properly operated without certain specific elements or optional elements as disclosed herein. Unless otherwise clearly stated, the terms in the claims have the common meaning in the art.

Unless otherwise clearly stated, if the terms in the present disclosure is inconsistent with the terms in other reference documents, then the meanings of the terms as defined in the present disclosure should be used.

What is claimed is:

1. An adjustable support for a swimming machine, the adjustable support comprising:
   a movable assembly configured to be fixedly mounted to the swimming machine;
   a fixed assembly configured to be fixed to a pool wall of a pool and selectively coupled to the movable assembly;
   wherein a first one of the movable assembly and the fixed assembly comprises a plurality of engaging portions and a second one of the movable assembly and the fixed assembly comprises a limiting member configured to mate with at least one of the plurality of engaging portions;
   wherein the movable assembly is switchable between a locked position and an unlocked position to thereby adjust a vertical position of the swimming machine;
   wherein the limiting member is configured to fixedly engage the at least one of the plurality of engaging portions in the locked position;
   wherein the limiting member is configured to be disengaged from the at least one of the plurality of engaging portions in the unlocked position, thereby enabling movement of the movable assembly relative to the fixed assembly,
   wherein the movable assembly comprises a first movable half connected to a second movable half and a hollow cavity defined between the first moveable half and the second moveable half, the movable assembly further comprising a guiding member disposed within the hollow cavity;
   wherein the first movable half and the second movable half each define limiting grooves, and the guiding member defines a guiding groove;
   wherein the limiting member extends through the limiting grooves and is configured to selectively engage the at least one of the plurality of engaging portions of the fixed assembly; and
   wherein movement of the guiding member causes the limiting pin to move along the limiting grooves, thereby causing the limiting pin to disengage from the at least one of the plurality of engaging portions.

2. The adjustable support of claim 1, wherein the fixed assembly comprises a first fixed half connected to a second fixed half and hollow cavity defined between the first fixed half and the second fixed half;
    wherein one of the first fixed half and the second fixed half comprises the plurality of engaging portions; and
    wherein the movable assembly is disposed within the hollow cavity of the fixed assembly and configured to engage the at least one of the plurality of engaging portions in the locked position.

3. The adjustable support of claim 2, wherein the first fixed half comprises a plurality of protrusions, and the second fixed half comprises a corresponding plurality of slots configured to be connected to the first fixed half.

4. The adjustable support of claim 2, wherein the movable assembly comprises the limiting member, and the fixed assembly comprises the plurality of engaging portions;
    wherein the movable assembly comprises a mounting base fixedly mounted to the provided swimming machine; and
    wherein the limiting member comprises a limiting pin configured to selectively engage the at least one of the plurality of engaging portions of the fixed assembly, and the limiting member is moveable to disengage from the at least one of the plurality of engaging portions, thereby placing the movable assembly in the unlocked position.

5. The adjustable support of claim 1, wherein the guiding groove defines an angle with respect to the limiting grooves in a range of 30 degrees to 60 degrees.

6. The adjustable support of claim 1, wherein the first movable half comprises a plurality of protrusion, and the second movable half comprises a corresponding plurality of slots configured to be connected to the plurality of protrusions of the first movable half.

7. The adjustable support of claim 1, wherein the movable assembly is configured to be manually moved between the locked position and the unlocked position; and
    wherein the adjustable support further comprises a latch handle coupled to the guiding member and configured to enable movement of the guiding member.

8. An adjustable support for a swimming machine, the adjustable support comprising:
    a movable assembly configured to be fixedly mounted to the swimming machine;
    a fixed assembly configured to be fixed to a pool wall of a pool and selectively coupled to the movable assembly;
    wherein a first one of the movable assembly and the fixed assembly comprises a plurality of engaging portions and a second one of the movable assembly and the fixed assembly comprises a limiting member configured to mate with at least one of the plurality of engaging portions;
    wherein the movable assembly is switchable between a locked position and an unlocked position to thereby adjust a vertical position of the swimming machine;
    wherein the limiting member is configured to fixedly engage the at least one of the plurality of engaging portions in the locked position;
    wherein the limiting member is configured to be disengaged from the at least one of the plurality of engaging portions in the unlocked position, thereby enabling movement of the movable assembly relative to the fixed assembly; and
    the adjustable support further comprising a latch handle coupled to the limiting member, the latch handle configured to enable the moveable assembly to be manually moveable between the locked position and the unlocked position.

9. An adjustable support for a swimming machine, the adjustable support comprising:
    a movable assembly configured to be fixedly mounted to the swimming machine;
    a fixed assembly configured to be fixed to a pool wall of a pool and selectively coupled to the movable assembly;
    wherein a first one of the movable assembly and the fixed assembly comprises a plurality of engaging portions and a second one of the movable assembly and the fixed assembly comprises a limiting member configured to mate with at least one of the plurality of engaging portions,
    wherein the movable assembly is switchable between a locked position and an unlocked position to thereby adjust a vertical position of the swimming machine;
    wherein the limiting member is configured to fixedly engage the at least one of the plurality of engaging portions in the locked position;
    wherein the limiting member is configured to be disengaged from the at least one of the plurality of engaging portions in the unlocked position, thereby enabling movement of the movable assembly relative to the fixed assembly; and
    the adjustable support further comprising an elastic return member configured to cause the movable assembly to automatically return to the locked position from the unlocked position.

10. A swimming machine, comprising:
    a swimming machine body; and
    an attachment bracket configured to attach the swimming machine body to a pool wall of a swimming pool;
    the swimming machine comprising at least one adjustable support comprising:
        a movable assembly fixedly mounted to the swimming machine body; and
        a fixed assembly attached to the attachment bracket and selectively coupled to the movable assembly;
        wherein a first one of the movable assembly and the fixed assembly comprises a plurality of engaging portions and a second one of the movable assembly and the fixed assembly comprises a limiting member configured to mate with at least one of the plurality of engaging portion;
        wherein the movable assembly is switchable between a locked position and an unlocked position to thereby adjust a vertical position of the swimming machine body;
        wherein the limiting member is configured to fixedly engage the at least one of the plurality of engaging portions in the locked position; and
        wherein the limiting member is configured to be disengaged from the at least one of the plurality of engaging portions in the unlocked position, thereby enabling movement of the movable assembly relative to the fixed assembly,
        wherein the movable assembly comprises a first movable half connected to a second movable half and a hollow cavity defined between the first moveable half and the second moveable half, and the movable assembly further comprising a guiding member disposed within the hollow cavity;

wherein the first movable half and the second movable half each define limiting grooves, and the guiding member defines a guiding groove;

wherein the limiting member extends through the limiting grooves and is configured to selectively engage the at least one of the plurality of engaging portions of the fixed assembly; and wherein movement of the guiding member causes the limiting pin to move along the limiting grooves, thereby causing the limiting pin to disengage from the at least one of the plurality of engaging portions.

11. The swimming machine of claim 10, wherein the fixed assembly comprises a first fixed half connected to a second fixed half and a hollow cavity defined between the first fixed half and the second fixed half;

wherein one of the first fixed half and the second fixed half comprises the plurality of engaging portions; and wherein the movable assembly is disposed within the hollow cavity of the fixed assembly and configured to engage the at least one of the plurality of engaging portions in the locked position.

12. The swimming machine of claim 11, wherein the first fixed half comprises a plurality of protrusions, and the second fixed half comprises a corresponding plurality of slots configured to be connected to the first fixed half.

13. The swimming machine of claim 10, wherein the movable assembly comprises the limiting member, and the fixed assembly comprises the plurality of engaging portions;

wherein the movable assembly comprises a mounting base fixedly mounted to the swimming machine body; and wherein the limiting member comprises a limiting pin configured to selectively engage the at least one of the plurality of engaging portions of the fixed assembly, and the limiting member is moveable to disengage from the at least one of the plurality of engaging portions, thereby placing the movable assembly in the unlocked position.

14. The swimming machine of claim 10, wherein the guiding groove defines an angle with respect to the limiting grooves in a range of 30 degrees to 60 degrees.

15. The swimming machine of claim 10, wherein the first movable half comprises a plurality of protrusions, and the second movable half comprises a corresponding plurality of slots configured to be connected to the plurality of protrusions of the first movable half.

16. The swimming machine of claim 10, wherein the movable assembly is configured to be manually moved between the locked position and the unlocked position; and wherein the at least one adjustable support further comprises a latch handle coupled to the guiding member and configured to enable movement of the guiding member.

17. The swimming machine of claim 10, wherein the swimming machine comprises two adjustable supports arranged in mirror symmetry with one another.

18. The swimming machine of claim 10, wherein the swimming machine comprises two adjustable supports, with the limiting members of each of the two adjustable supports being movable in opposite directions with respect to each other and each configured to disengage from a corresponding one or more of the plurality of engaging portions in the unlocked position.

19. A swimming machine, comprising:
a swimming machine body; and
an attachment bracket configured to attach the swimming machine body to a pool wall of a swimming pool;
the swimming machine comprising at least one adjustable support comprising:
a movable assembly fixedly mounted to the swimming machine body; and
a fixed assembly attached to the attachment bracket and selectively coupled to the movable assembly;
wherein a first one of the movable assembly and the fixed assembly comprises a plurality of engaging portions and a second one of the movable assembly and the fixed assembly comprises a limiting member configured to mate with at least one of the plurality of engaging portion;
wherein the movable assembly is switchable between a locked position and an unlocked position to thereby adjust a vertical position of the swimming machine body;
wherein the limiting member is configured to fixedly engage the at least one of the plurality of engaging portions in the locked position; and
wherein the limiting member is configured to be disengaged from the at least one of the plurality of engaging portions in the unlocked position, thereby enabling movement of the movable assembly relative to the fixed assembly,
the at least one adjustable support further comprising a latch handle coupled to the limiting member, the latch handle configure to enable the moveable assembly to be manually moveable between the locked position and the unlocked position.

20. A swimming machine, comprising:
a swimming machine body; and
an attachment bracket configured to attach the swimming machine body to a pool wall of a swimming pool;
the swimming machine comprising at least one adjustable support comprising:
a movable assembly fixedly mounted to the swimming machine body; and
a fixed assembly attached to the attachment bracket and selectively coupled to the movable assembly;
wherein a first one of the movable assembly and the fixed assembly comprises a plurality of engaging portions and a second one of the movable assembly and the fixed assembly comprises a limiting member configured to mate with at least one of the plurality of engaging portion;
wherein the movable assembly is switchable between a locked position and an unlocked position to thereby adjust a vertical position of the swimming machine body;
wherein the limiting member is configured to fixedly engage the at least one of the plurality of engaging portions in the locked position; and
wherein the limiting member is configured to be disengaged from the at least one of the plurality of engaging portions in the unlocked position, thereby enabling movement of the movable assembly relative to the fixed assembly,
the adjustable support further comprising an elastic return member configured to cause the movable assembly to automatically return to the locked position from the unlocked position.

* * * * *